INVENTOR
H. C. FLEMING
BY John K. Mullarney
ATTORNEY

INVENTOR
H. C. FLEMING
BY John K. Mullaney
ATTORNEY

INVENTOR
H. C. FLEMING
BY John K. Mullarney
ATTORNEY

United States Patent Office 3,142,723

Patented July 28, 1964

3,142,723

FREQUENCY SHIFT KEYING SYSTEM

Howard C. Fleming, Millburn, N.J., assignor to Bell Telephone Laboratories, Incorporated, New York, N.Y., a corporation of New York Filed Nov. 29, 1961, Ser. No. 155,861

7 Claims. (Cl. 178—66)

This invention relates to data transmission systems and, more particularly, it relates to a frequency shift keying system.

Data signals comprise bits of information that may be represented by pulse signals of two or more amplitudes arranged in data words in different permutations of a code to represent conventional letters, numbers, or other prearranged symbols. In one scheme which is common in data systems, the data bits are designated "mark" or "space" depending upon the amplitude of the data pulse.

In data transmission systems for communicating between data processing terminals, one perennial problem is that of overcoming the effect of noise on transmission accuracy. Improvement in transmission accuracy in the presence of noise may be realized by using the different pulse amplitudes for modulating the frequency of a carrier oscillation rather than sending the raw pulses between transmission terminals. In such a frequency modulated or frequency shift system there appear on the transmission line between terminals sequential bursts of oscillations of different frequencies representing mark and space data bits.

A frequency shift scheme that has become increasingly popular employs a pair of harmonically related pulse patterns as carrier waves. These pulse patterns are keyed to the transmission line under the control of the mark and space bits of the baseband data signal. This scheme results in a considerable simplification of the transmitter and receiver circuitry since the pulse or "square-wave" carriers can be readily handled by digital techniques; see the copending application of E. R. Kretzmer and R. A. Winter, Serial No. 89,831, filed February 16, 1961.

It is in the demodulation of the frequency shift signals at the receiving station that most of the difficulties of frequency shift keying make themselves apparent. Various frequency discriminator arrangements of varying degrees of complexity have been proposed heretofore, but these generally suffer from transient problems, low signal-to-noise, and the like. Distinguishing the two carrier frequencies in the time domain (e.g., by integration) rather than in the frequency domain has proven satisfactory particularly where the carrier frequencies are sufficiently removed from each other. However, where because of the dictates of the transmission facility the carrier frequencies are such that the time difference between the half-periods of each is small, accurately distinguishing the same in the time domain becomes exceedingly difficult.

It is, therefore, an object of the present invention to improve demodulation techniques for frequency shift data signals.

A further object of the invention is to demodulate frequency shift data signals by employing improved, yet simplified, digital techniques.

A still further object is to provide a demodulator, for frequency shift data signals, having a high signal-to-noise ratio.

Still another object of the invention is to demodulate frequency shift data signals using homodyne detection techniques to thereby achieve improved signal-to noise transmission.

As in the prior art frequency shift keying systems, a pair of frequency related (e.g., harmonically related) and synchronized pulse patterns are keyed to a transmission line under the control of the mark and space bits of a baseband data bit stream. However, as a result of, and in accordance with the present invention, a very wide variety of frequency related pulse patterns are usable and no restrictions need be imposed on the choice of the same because of one or more limitations imposed by the demodulation process utilized.

In accordance with the invention, the baseband signal is recovered at the receiving end through a digitalized homodyne detection scheme. To this end, timing circuits (e.g., bandpass filter means) derive, from the received signal, a pair of pulse patterns that are synchronous with those contained in said received signal and of the same frequency as the afore-mentioned pulse patterns. These derived pulse patterns are respectively compared or mixed with the received signal in simple logic circuitry (e.g., EXCLUSIVE-OR gates) and a pulse pattern is obtained having the same sequence of mark and space bits as the original baseband data bit stream.

The advantages and features of the invention will become more apparent from the following detailed description which, together with the accompanying drawings, discloses a preferred embodiment.

Figure 2:
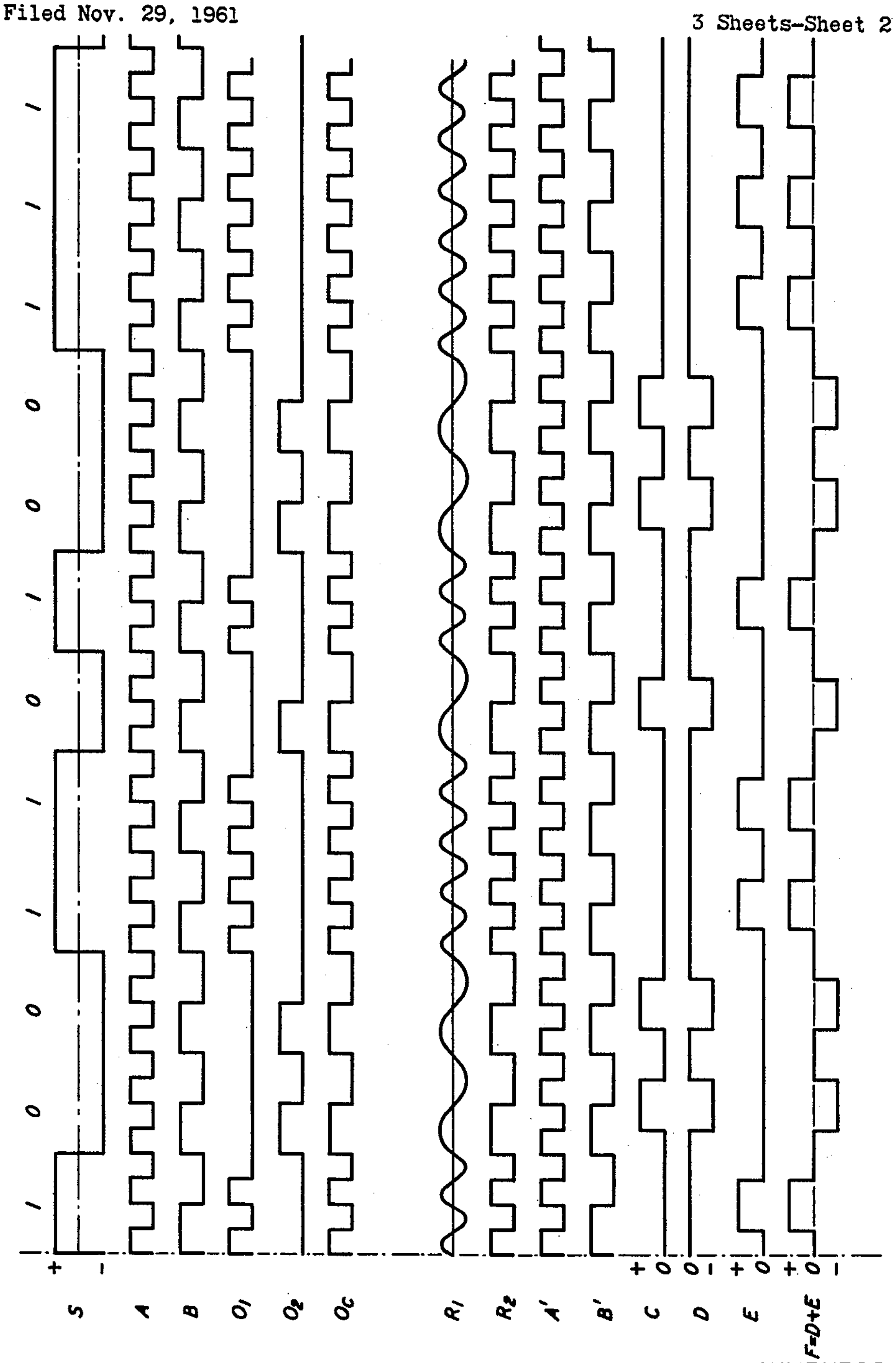
Figure 4:
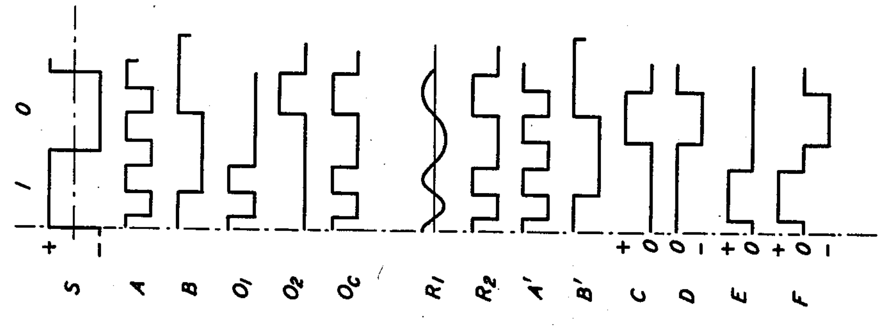
Figure 3:
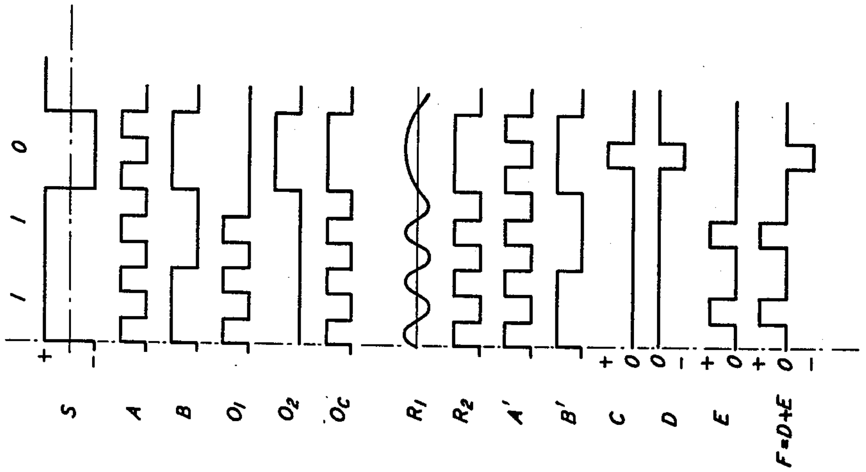

FIGS. 2 through 4 comprise waveforms useful in the explanation of the invention.

Figure 1:
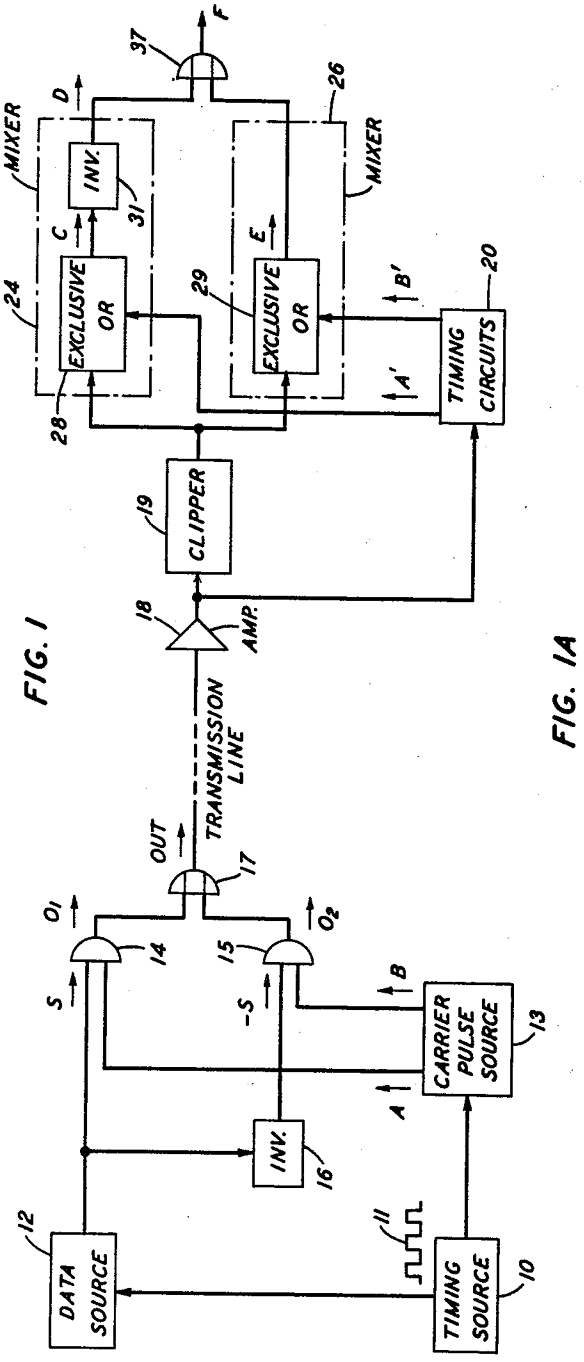
FIG. 1 is a schematic block diagram of a frequency shift keying systems incorporating the principles of the present invention.

Turning now to FIG. 1 of the drawings, timing source 10, which may, for example, be an accurately controlled-frequency oscillator, supplies an accurately timed square wave 11 to data source 12. This square wave 11 is utilized in data source 12 as a timing wave for generating a synchronous serial bit stream which may have modulated thereon, by coding techniques, the data to be transmitted. A typical baseband data bit stream is illustrated by waveform S of FIG. 2. The baseband data signal is assumed to be a bipolar signal of positive and negative pulses, a mark or "1" bit being represented by a positive voltage level and a space or "0" bit by a negative voltage level.

The square wave 11 is also supplied to carrier pulse source 13 where it is utilized as a timing wave for generating a pair of synchronous pulse patterns such as shown by waveforms A and B of FIG. 2. These pulse patterns serve as the carrier waves for the baseband data signal. Simple logic circuitry is used to gate or "key" the pair of pulse patterns to a transmission line under the control of the mark and space bits of said baseband signal.

The frequencies of the square-wave carriers are in general determined by the bandpass characteristics of the transmission facility. That is, they are selected to match or "fit" the frequency spectrum of the transmission facility. For example, for a voice frequency transmission line (e.g., 500 to 3000 cycles per second) the carrier wave frequencies may advantageously be 1000 and 2000 cycles per second. The prior art frequency shift keying arrangements have commonly required that the carrier wave frequencies be harmonically related to each other and to the baseband signal. However, as will become more apparent hereinafter, the frequency shift keying system of the present invention is not so limited. That is, while harmonically related carrier frequencies can be utilized to advantage herein, the same need not be so related. Specifically, the carriers need only be frequency related in the sense that the difference therebetween should be an integral multiple of the baseband data bit rate.

The baseband data bit stream from data source 12 is fed directly to the input of AND gate 14, and it is also delivered to AND gate 15 via the inverter 16. The synchronous pulse patterns A and B provide the other inputs to AND gates 14 and 15, respectively. As will be clear to those in the art, the AND gates require two like inputs (of positive potential for the assumed case) to produce an output signal. Accordingly, with the waveforms S and A of FIG. 2 delivered to the input of AND gate 14 the output waveform $O_1$ will be derived therefrom. The pulses of pulse pattern A are thus gated to the transmission line, via output buffer gate 17, during each "marking" period, but not of course during a "spacing" peirod. The alternative is true however for the pulses of pulse pattern B. The space or "0" bits of the baseband signal are represented as a negative potential level, but after inversion in inverter 16 they appear as a positive potential input to AND gate 15. Thus, the pulses of pulse pattern B are gated to the transmission line during each spacing period. The output from AND gate 15 is illustrated by the waveform $O_2$, with the combined AND gate output thus illustrated by the waveform $O_c(O_c=O_1+O_2)$. The synchronous pulse patterns are thus alternately switched or gated to the transmission line in accordance with the presence of a mark or space bit in the baseband data signal.

In traversing the transmission line the frequency shift data signals will generally be distorted in one or more respects. Typically, it may be desirable to amplitude and delay equalize the received signal (by means not shown, but well known to those in the art) at the receiving end of the line. The received signal is typified by the waveform $R_1$ of FIG. 2. To restore this received signal to a rectangular pattern such as shown by waveform $R_2$, the same is amplified and then clipped in amplifier 18 and clipper 19.

Recovery of data is accomplished at the receiver through a digitalized homodyne type demodulator constructed in accordance with the principles of the present invention. To this end, timing circuits 20 are coupled to the output of the amplifier 18 to derive, from the received signal $R_1$, a pair of pulse patterns A′ and B′ that are synchronous with those contained in said received signal and of the same frequency as the first-mentioned pulse patterns A and B.

Figure 1A:
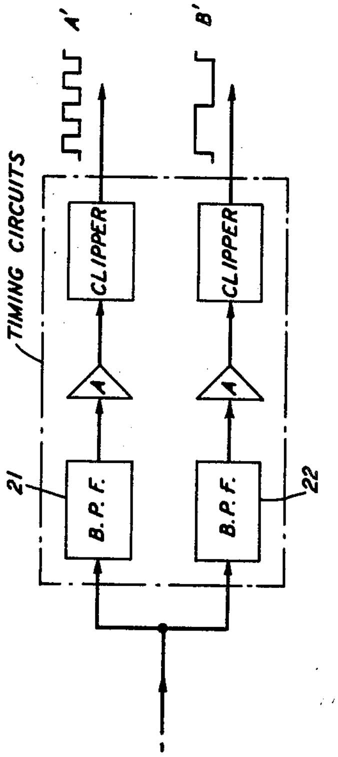
FIG. 1A is a detailed schematic diagram of the timing circuits of FIG. 1.

There are numerous ways of deriving the pulse patterns A′, B′ from the received signal, and the invention is in no way limited to the specific manner in which the same is accomplished. A typical way in which these pulse patterns can be derived is illustrated in FIG. 1A of the drawings. Here the amplified received signal is delivered to the bandpass filters 21 and 22, which are respectively tuned to the fundamental frequencies of the carriers A and B. Any of the numerous inductance-capacitance bandpass filter arrangements of the prior art can be utilized to advantage herein. All that is necessary in this regard is that each filter pass a given fundamental frequency, while rejecting other frequencies and particularly the other fundamental carrier frequency. The output of each bandpass filter is then amplified and clipped to provide the rectangular pulse patterns A′ and B′.

The derived pulse pattern A′ is delivered to the mixer 24 wherein it is mixed or "beat" with the received pulse pattern output from clipper 19. In similar fashion, the pulse pattern B′ is fed to mixer 26 along with said received pulse pattern (i.e., waveform $R_2$). The mixers 24 and 26 comprise simple logic circuitry and, as will be clear hereinafter, the combined output therefrom consists of a pulse pattern having the same sequence of mark and space bits as the original baseband data bit stream.

The mixers 24 and 26 each comprise a circuit known generally in the computer art as an EXCLUSIVE-OR circuit. An EXCLUSIVE-OR circuit is a gate with two inputs which performs the following logic. If a pulse signal appears at either input terminal, an output results; but if pulses appear simultaneously at both inputs, no output pulse results. That is, the gate is responsive to the presence of an input energizing signal at either, but not both, input terminals. A typical EXCLUSIVE-OR circuit is described in "Pulse and Digital Circuits," by Millman and Taub, McGraw-Hill Book Company, Inc. (1956), page 411. The above-described operation or function is also known in the art as a "half-adder function" and the circuitry for accomplishing the same is then called a PARTIAL ADDER.

With the waveforms $R_2$ and A′ delivered to the input terminals of EXCLUSIVE-OR gate 28, a pulse pattern such as shown by waveform C of FIG. 2 will be derived therefrom. Comparing the first-mentioned waveforms, it will be seen that they correspond, at first, to each other; that is, up to the termination of the third pulse of waveform A′. Accordingly, since the pulses of these waveforms appear simultaneously at the two input terminals of EXCLUSIVE-OR gate 28 no output is initially derived therefrom. However, with the termination of the third pulse of pulse pattern A′, there is now no simultaneously occurring pulse offered by pulse pattern A′ and hence, by reason of the described EXCLUSIVE-OR logic, a pulse signal will appear at the output of gate 28. If the waveforms $R_2$ and A′ are further compared in the described fashion the derivation of the complete waveform C will be readily apparent.

The pulse pattern C, which appears at the output of EXCLUSIVE-OR gate 28, is inverted in inverter 31 and appears at the output thereof as pulse pattern D.

The waveforms $R_2$ and B′ are respectively fed to the two input terminals of EXCLUSIVE-OR gate 29 and a pulse pattern such as shown by waveform E is derived therefrom. Here again a pulse signal appears at the output of the EXCLUSIVE-OR gate in response to the presence of an input energizing pulse signal at either, but not both, input terminals.

The pulse patterns D and E are combined to give the output pulse pattern F $(F=D+E)$. Comparing this latter pulse pattern with the original baseband signal, it will be apparent that pulse pattern F contains the same essential symbols and the same sequence of mark and space bits as the original input baseband signal S. If desired, a conventional amplitude detector can be used herein to regenerate the exact configuration of the original baseband signal from pulse pattern F.

The inverter 31 may be coupled to the output of either EXCLUSIVE-OR gate. With inverter 31 coupled to the output of gate 29, the combined pulse pattern is simply the inverse of the illustrated pulse pattern F. This inversion in no way sacrifices information or intelligibility.

The combined pulse pattern F is coupled to a data utilization device via output buffer OR gate 37.

It should be clear at this point that the described system will operate in the described manner regardless of which data bit keys which square-wave carrier to the transmission line. Thus, the pulse pattern B can just as readily be keyed to the transmission line during a marking period, with pattern A then gated to the line during a spacing period.

As indicated heretofore, a wide variety of frequency related square-wave carriers can be utilized in a frequency sifting keying system constructed in accordance with the invention. FIG. 3, for example, illustrates the waveforms for the case in which a mark is represented by one and one-half sine wave cycles and a space by one-half a sine wave cycle. These latter waveforms have been designated in a manner similar to the waveforms of FIG. 2 and since they are derived in the same manner using the same circuitry as that heretofore described, a further detailed description of these waveforms is not considered necessary.

In FIG. 4 the square-wave carriers bear a cosine relationship to the baseband data bit stream. In this case a mark is represented by one and one-half cosine cycles, and a space by one-half a cosine cycle. Here again, however, an output pulse pattern is derived at the receiver which possesses the same sequence of mark and space bits as the original baseband data bit stream. The waveforms of FIG. 4 are likewise arrived at in the same manner using the same circuitry as that heretofore described.

In the foregoing manner, waveforms can be readily arrived at for numerous other frequency related square-wave carriers, and, again, all that is necessary in this regard is that the carriers be frequency related in the sense that the difference between them should be an integral multiple of the baseband data bit rate.

It should be understood therefore that the foregoing disclosure relates to only a preferred embodiment of the invention and that numerous modifications or alterations may be made therein without departing from the spirit and scope of the invention.

What is claimed is:

1. A frequency shift keying system comprising a transmission medium, a source of sequential binary coded data, a source of two frequency related square-wave signals having fundamental frequencies lying in the frequency spectrum of said transmission medium, the difference between the frequencies of said square-wave signals being an integral multiple of the sequential binary data bit rate, means for keying one of said square-wave signals to the transmission medium as a marking frequency under the control of said sequential binary coded data, means for keying the other of said square-wave signals to the transmission medium as a spacing frequency also under the control of said sequential binary coded data, a receiver connected to the remote end of said transmission medium, said receiver comprising means for deriving from the received signal a second pair of square-wave signals that are synchronous with the square-wave signals contained in said received signal and of the same frequencies as the first-mentioned square-wave signals, a pair of circuit means each having a pair of input terminals, each said circuit means providing an output signal in response to an input energizing signal at either but not both of said input terminals, means coupling said received signal and one of said second pair of square-wave signals to respective input terminals of one of said circuit means, means coupling said received signal and the other of said second pair of square-wave signals to respective input terminals of the other of said circuit means, and means for inverting the output of one of said circuit means and combining it with the output of the other circuit means to provide a pulse pattern having a sequence of mark and space data bits that corresponds to that of the original sequential coded data signal.

2. A frequency shift keying system as defined in claim 1 wherein each said circuit means comprises an EXCLUSIVE-OR gate.

3. A frequency shift keying system as defined in claim 2 wherein said means for deriving square-wave signals from the received signal comprises a pair of bandpass filters respectively tuned to the fundamental frequencies of said square-wave signals.

4. In a frequency shift keying system wherein a pair of harmonically related and synchronized pulse patterns are keyed to a transmission line under the control of the mark and space bits of a baseband data bit stream, a receiver connected to the remote end of the transmission line, said receiver comprising means for deriving from the received signal a second pair of pulse patterns that are synchronous with the pulse patterns contained in said received signal and of the same frequencies as the first-mentioned pulse patterns, a pair of EXCLUSIVE-OR circuits, means coupling said received signal and one of said second pair of pulse patterns to the input of one of said EXCLUSIVE-OR circuits, means coupling said received signal and the other of said second pair of pulse patterns to the input of the other of said EXCLUSIVE-OR circuits, and means for inverting the output of one of said EXCLUSIVE-OR circuits and combining it with the output of the other EXCLUSIVE-OR circuit to provide a pulse pattern having a sequence of mark and space bits the same as that of the original baseband bit stream.

5. In a frequency shift keying system wherein a pair of frequency related and synchronized pulse patterns are keyed to a transmission line under the control of the mark and space bits of a baseband data bit stream, said pulse patterns being frequency related in the sense that the frequency difference therebetween is an integral multiple of the baseband data bit rate, a receiver connected to the remote end of the transmission line, said receiver comprising means for deriving from the received signal a second pair of pulse patterns that are synchronous with the pulse patterns contained in said received signal and of the same frequencies as the first-mentioned pulse patterns, a pair of circuit means each having a pair of inputs, each said circuit means providing an output signal in response to an energizing signal at either but not both of said inputs, means coupling said received signal and one of said second pair of pulse patterns to the input of one of said circuit means, means coupling said received signal and the other of said second pair of pulse patterns to the input of the other of said circuit means, and means for inverting the output of one of said circuit means and combining it with the output of the other circuit means to provide a pulse pattern having a sequence of mark and space bits the same as that of the original baseband bit stream.

6. In a frequency shift keying system in accordance with claim 5, wherein each said circuit means comprises an EXCLUSIVE-OR gate.

7. In a frequency shift keying system as defined in claim 6, wherein said means for deriving pulse patterns from the received signal comprises a pair of bandpass filters respectively tuned to the fundamental frequencies of the first-mentioned pair of pulse patterns.

References Cited in the file of this patent

UNITED STATES PATENTS 2,864,953 De Lange -------------- Dec. 16, 1958